Aug. 12, 1941.  J. E. LIEBAUT  2,252,011
DRAFTING ARRANGEMENT FOR SPINNING FRAMES AND OTHER SIMILAR MACHINES
Filed Feb. 1, 1939  2 Sheets-Sheet 1

INVENTOR
Joseph Eugène Liebaut
By
his ATT'Y.

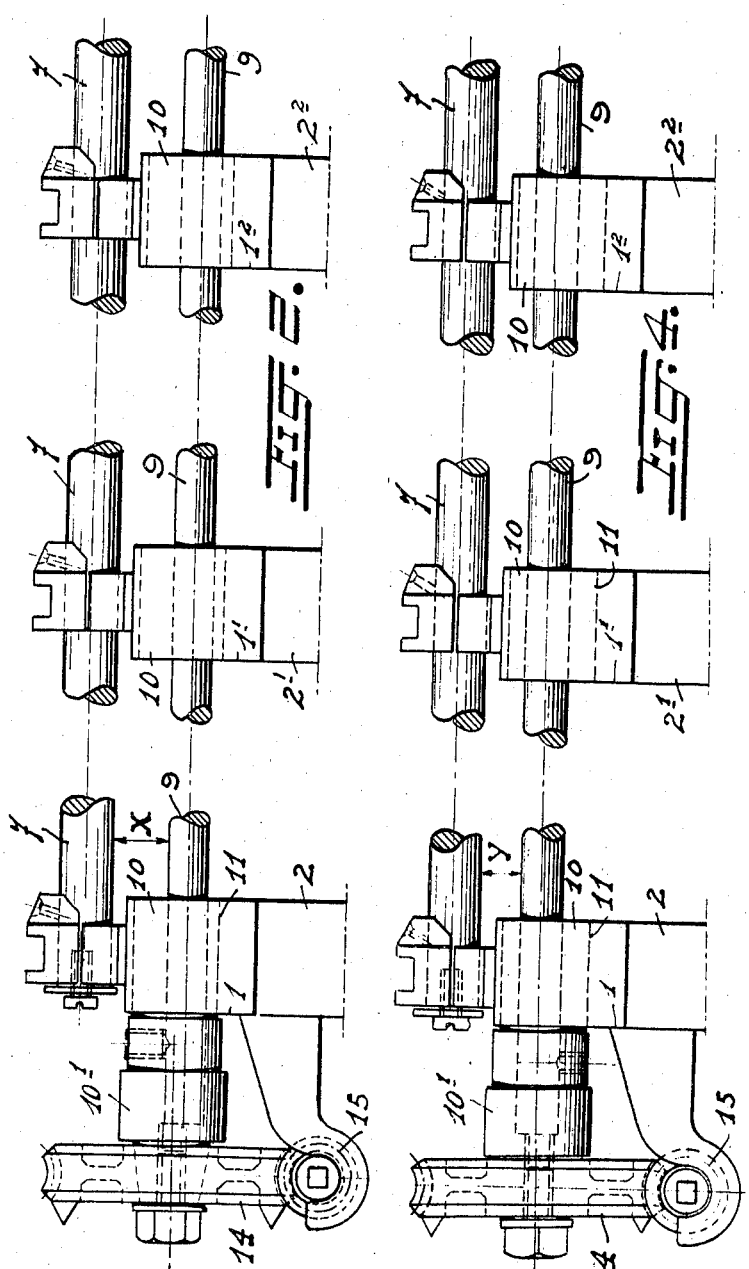

Patented Aug. 12, 1941

2,252,011

UNITED STATES PATENT OFFICE 2,252,011

DRAFTING ARRANGEMENT FOR SPINNING FRAMES AND OTHER SIMILAR MACHINES

Joseph Eugène Liebaut, Alost, Belgium, assignor to "Filature du Canal, Societe Anonyme," Alost, Belgium, a Belgian company Application February 1, 1939, Serial No. 254,031
In Belgium February 17, 1938

2 Claims. (Cl. 19—131)

The present invention relates to drafting arrangements of spinning frames and other similar machines comprising between the delivery and feed rollers resilient nips for the sliver each formed by an endless belt and a roller arranged intermediate the pressure rollers of the delivery roller and feed roller.

The object of the invention is to facilitate in an appreciable manner the control of the frame according to the quality and the number of the count, to obtain a precise and uniform control and to obviate any stopping of the frame for regulation and all necessity for dismounting.

According to the invention, a continuous rod is provided extending the whole length of the frame and provided with a single control allowing for operating simultaneously on the lower part of all the endless bands so as to vary the distance apart between the continuous rod and the roller arranged between the pressure rollers of the feed rollers and delivery and vary to the same degree the pressure of each belt against the corresponding roller forming the resilient nip with this belt.

The invention will be described with reference to the accompanying drawings:

Fig. 2 is a plan view showing the continuous rod.

Figs. 3 and 4 are similar views to Figs. 1 and 2 showing the same parts after operation of the single rod.

Figure 1:
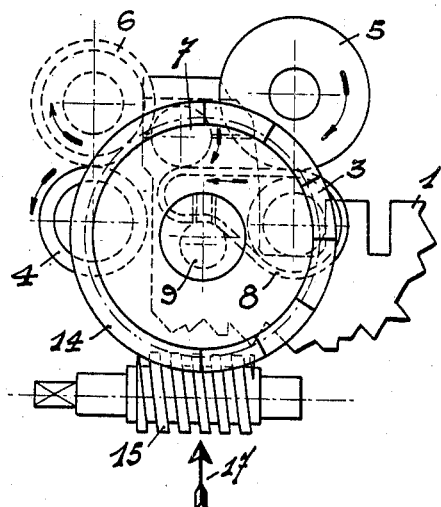
Fig. 1 is a side view showing the arrangement of the rollers the endless belt and the continuous rod in a frame according to the invention.
Figure 3:
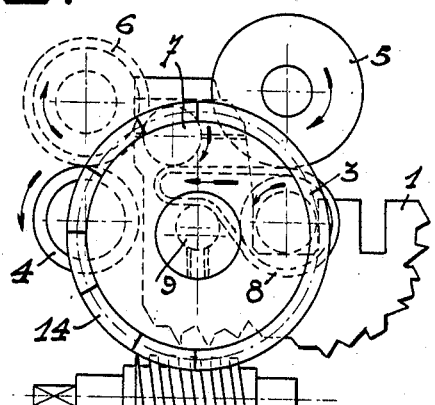

In the accompanying drawings, 1 (Fig. 1) represents one drawing head of the frame; in Figs. 2 and 4, 1, 1¹ and 1² are mounted on their base on the roller frame, 3 (Figs. 1 and 3) is a feed roller and 4 a delivery roller, 5—6 are pressure rollers respectively for the feed roller 3 and delivery roller 4.

Between the pairs of rollers 3, 5 and 4, 6 is situated an arrangement forming a resilient nip comprising a roller 7 and a belt 8 which passes around the roller 3 and which is driven by the roller 3 solely through the free pressure of the roller 5.

As shown in the drawings a rod 9 is provided which extends the whole length of the frame and which is destined to act from below on the endless belts 8 to vary the pressure of these belts against the rollers 7.

Figure 5:
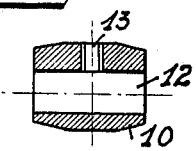
Fig. 5 is a detail view.
Figure 6:
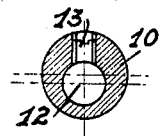
Fig. 6 is a sectional view at right angles to the section of Fig. 5.

On each head is mounted a cylindrical boss 10 with free ends which can rotate in an aperture 11 in the head forming a bearing. These cylindrical bosses 10 are formed with a bore 12 (Fig. 5) corresponding in diameter to that of the rod 9 arranged eccentrically. All these cylindrical bosses 10 with eccentric bores are affixed on the rod 9 in the same position for example by means of grub screws 13.

The control of the rod 9 carrying as many cylindrical bosses 10 as there are heads is arranged at the end of the frame.

These control means comprise a boss 10¹ longer than the others and forming a projection with respect to the last head of the frame and on this boss is fixed a worm wheel 14 operated by a worm 15 rotated by hand.

Under the conditions when the worm 15 is rotated the worm wheel 14 is rotated and this latter rotates the boss 10¹ and the rod 9 which executes an eccentric movement in approaching or receding from the roller or rollers 7. A single control may thus vary the distance apart between the roller 7 and the rod 9. This distance apart which is $x$ in Fig. 2 may equally become $Y$ (Fig. 4). A comparison between Figs. 1 and 3 and Figs. 2 and 4 respectively shows clearly the variation of this distance apart when the single control is operated.

By altering the distance in question the pressure of the belt 8 on the roller 7 is altered uniformly for the whole frame, thus obtaining a nip suitable for the quality of cotton and the count of the sliver in use and thus ensuring the production of a strong yarn and of uniform quality which was not possible up to the present time since the regulation was obtained in sections by altering the locking screws at the ends of the individual rods in the apertures in the heads.

In previous constructions, it was necessary to remove all the pressure rolers (5, 6, 7) and also the cleaning rollers in order to obtain access to the adjusting screws when the control was to be operated. This resulted in a considerable loss of time because each pair of spindles has associated therewith a series of pressure and cleaning rollers and each frame comprises many hundreds of spindles. In the present construction, this disadvantage is obviated as the control can be operated without removing the pressure rollers or cleaning rollers.

In short the invention thus allows for obtaining a considerable gain in time whilst ensuring a uniformity of the quality of the yarn.

Further, the loss in production is eliminated, which was caused heretofore by the stoppage of the frame in constructions in which for control or regulation it was necessary to remove the great number of pressure and cleaning rollers and to put them back into place after the regulation had been effected. It may be mentioned that in many cases this entire work had to be done repeatedly when the yarn did not have the required strength after regulation.

The edge of the wheel 14 may be formed as a graduated dial and co-operate with a pointer 17 to allow for reading of the distance between the roller or rollers 7 and the rod 9.

I claim:

1. In a drafting arrangement for spinning frame comprising between the delivery and feed rollers resilient nips for the sliver each formed by an endless band and at least one roller arranged intermediate the pressure rollers of the delivery and feed rollers, in combination a continuous rod extending the whole length of the frame, a single control for the said rod whereby it is possible to operate simultaneously on the lower part of all the endless bands so as to vary the distance apart between the said continuous rod and the said intermediate roller arranged between the pressure rollers of the delivery and feed rollers and to vary to the same degree the pressure of each belt against the corresponding roller forming the resilient nip with this belt, the single control of the said continuous rod being formed by a worm wheel provided with a boss mounted in the end head and longer than the bosses arranged in the apertures in the other heads, this worm wheel being operated by a worm.

2. In a drafting arrangement for spinning frame comprising between the delivery and feed rollers resilient nips for the sliver each formed by an endless band and at least one roller arranged intermediate the pressure rollers of the delivery and feed rollers, in combination a continuous rod extending the whole length of the frame, a single control for the said rod whereby it is possible to operate simultaneously on the lower part of all the endless bands so as to vary the distance apart between the said continuous rod and the said intermediate roller arranged between the pressure rollers of the delivery and feed rollers and to vary to the same degree the pressure of each belt against the corresponding roller forming the resilient nip with this belt, the single control of the said continuous rod being formed by a worm wheel provided with a boss mounted in the end head and longer than the bosses arranged in the apertures in the other heads, this worm wheel being operated by a worm, the said control being provided with a pointer so as to indicate at any time the distance apart of the continuous rod and the intermediate roller situated between the pressure rollers of the delivery and feed rollers.

JOSEPH EUGÈNE LIEBAUT.